United States Patent [19]

Bones et al.

[11] 4,011,366

[45] Mar. 8, 1977

[54] ELECTRIC CELLS

[75] Inventors: Roger John Bones, Abingdon; John Richard Harbar, Wantage, both of England

[73] Assignee: United Kingdom Atomic Energy Authority, England

[22] Filed: May 11, 1976

[21] Appl. No.: 685,424

[30] Foreign Application Priority Data

May 22, 1975 United Kingdom ............ 22389/75

[52] U.S. Cl. ................................ 429/61; 429/104
[51] Int. Cl.² ........................................ H01M 2/00
[58] Field of Search ............ 429/104, 30, 31, 191, 429/193, 102, 61

[56] References Cited

UNITED STATES PATENTS 3,883,367  5/1975  Chiku et al. .................. 429/104

Primary Examiner—C. F. LeFevour
Attorney, Agent, or Firm—Larson, Taylor and Hinds

[57] ABSTRACT

In a sodium-sulphur electric cell, a circuit breaking device responsive to temperature or current is inserted inside the cell in series in the internal electric circuit of the cell so as to open circuit the cell in the event of either an abnormal cell temperature or current. The circuit breaking device may be in the form of a fusible metal link or a temperature sensitive switch.

9 Claims, 5 Drawing Figures

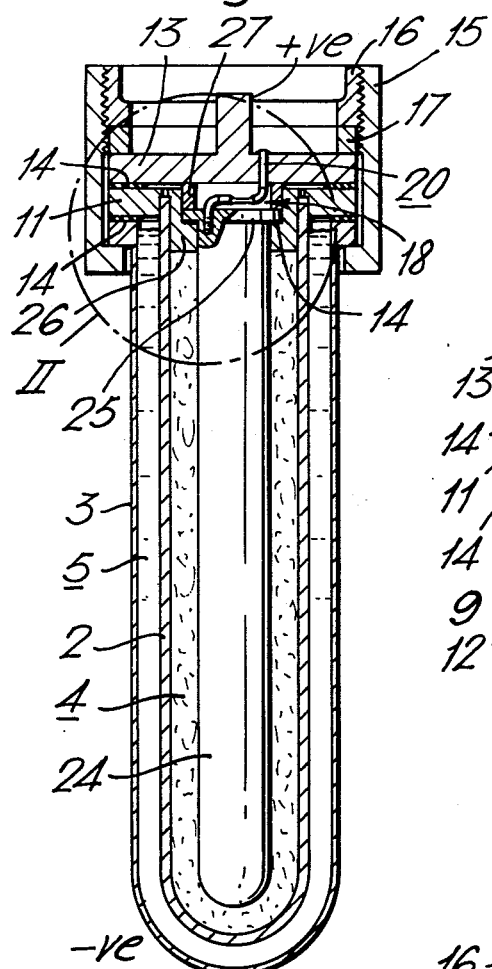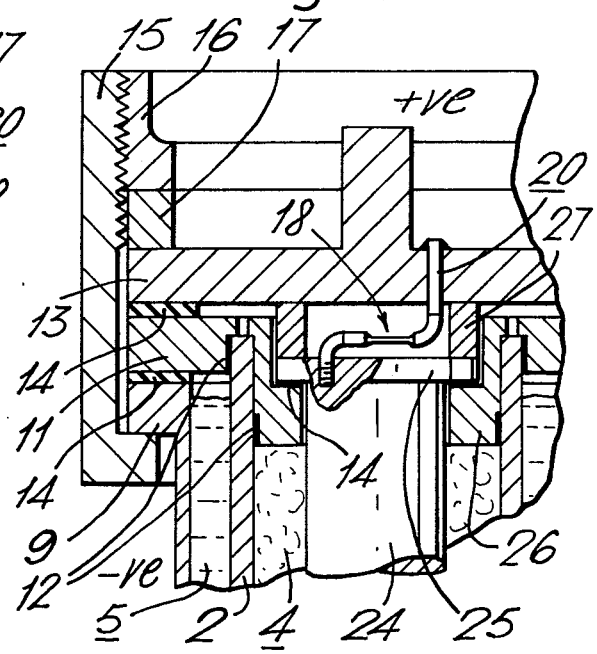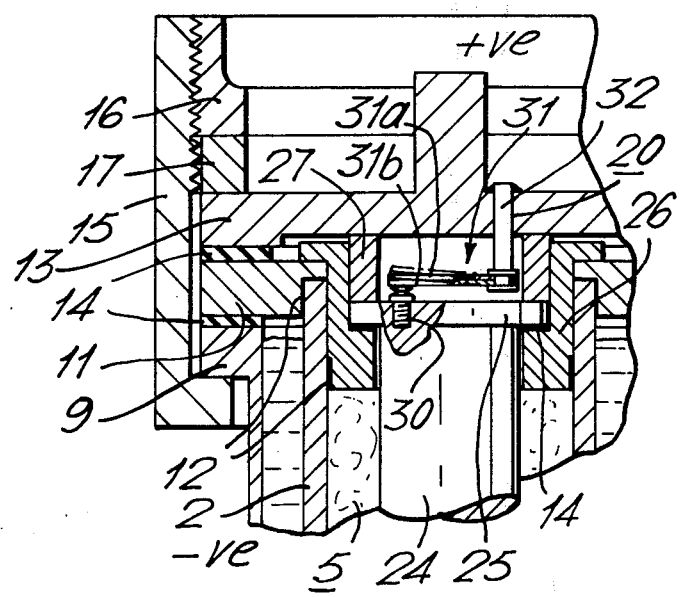

ELECTRIC CELLS

BACKGROUND OF THE INVENTION

This invention relates to electric cells of the kind for use with a liquid anode, a liquid cathode, a solid electrolyte and a current collecting means. Examples of these cells are shown in our co-pending U.S. Ser. No. 556,500 and U.S. Pat. No. 3,932,195.

Such electric cells may have an operating temperature of the order of 360° C. In the event of some internal electrical fault occurring in the cell leading to short circuiting of the output terminals e.g. at the seals, this temperature may rise due to increased current flow to a level where damage to the solid electrolyte or loss of cell integrity can result.

SUMMARY OF THE INVENTION

According to the present invention, in an electric cell having a compartment for a liquid anode, a compartment for a liquid cathode, a solid electrolyte and a current collecting means, circuit breaking means arranged to be responsive to the internal temperature of the cell and/or electric current flowing in the internal electric circuit of the cell are adapted upon the occurrence of abnormal temperature and/or electric current to restore the cell to open circuit voltage.

The circuit breaking means may be in the form of a fusible link, or a temperature sensitive switch, inserted in series in the internal electric circuit of the cell.

BRIEF EXPLANATION OF THE DRAWINGS

To enable the present invention to be more readily understood attention is directed by way of example only to the accompanying drawings, in which:

FIG. 2 shows in median section an electric cell similar to that shown in FIG. 1 but in which the relative positions of the compartment for the liquid sodium and the liquid sulphur are reversed;

FIG. 2a shows to an enlarged scale the detail in the circle II in FIG. 2; and

FIG. 3 shows the detail of FIG. 2a but with an alternative means responsive to the temperature and/or electric current generated by the cell.

In the aforementioned Figures, like parts have like numerals.

DETAILED DESCRIPTION OF THE INVENTION

Figure 1:
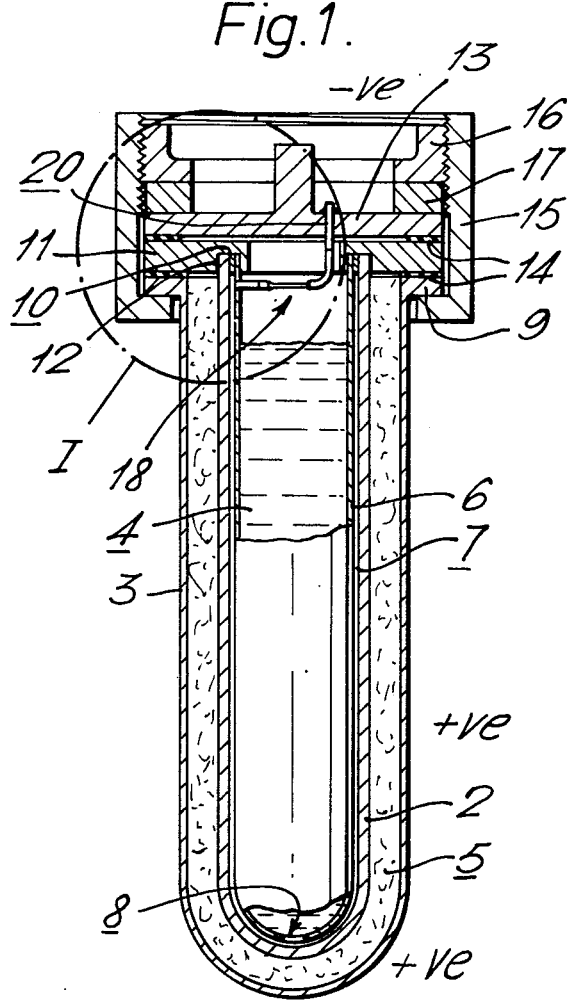
FIG. 1 shows in median section an electric cell of tubular form having an inner compartment for liquid sodium (anode) encompassed by an outer compartment for liquid sulphur (cathode)

Referring now to FIG. 1, the electric cell is of circular form in axial transverse section and comprises a tubular solid electrolyte 2 of beta-alumina disposed within a tubular casing 3 of stainless steel to define an inner compartment 4 for sodium and an outer annular compartment 5 for sulphur impregnated in a graphite felt. A wicking tube 6 of stainless steel is disposed in the inner compartment 4 co-axially with the solid electrolyte 2 to define a wicking space 7 to constrain liquid sodium to wet the surface of the solid electrolyte 2 by capillary action, entry to the wicking space 7 from the space inside the tube 6 being through an inlet 8 at the otherwise closed end of the wicking tube 6. The casing 3 provides the current collecting means and thereby the positive terminal.

Figure 1A:
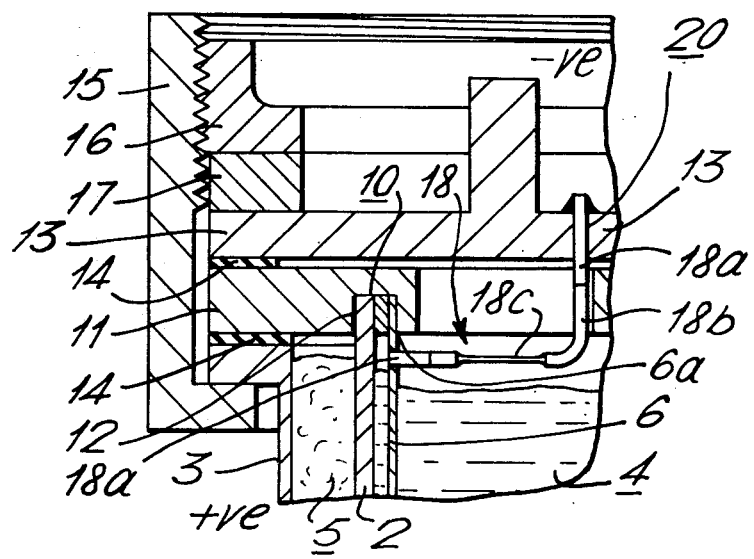
FIG. 1a shows to an enlarged scale the detail in the circle I in FIG. 1.

Referring now to FIG. 1a, the casing 3 has a flange 9 at its open end. The wicking tube 6 has a "Kovar" nickel/iron tubular extension 6a butt-welded to it, the extension 6a and the solid electrolyte 2 being located in an annular recess 10 in an alpha-alumina flange 11, and joined to the flange 11 by a glass frit seal 12.

The cell is closed as shown by an end cap 13 of stainless steel and held together, using "Grafoil" seals 14 between the flanges 9 and 11, and between the other side of flange 11 and the end cap 13, by an internally threaded sleeve 15 of low alloy steel which engages the underside of the casing flange 9 and is clamped by an annular nut 16 of stainless steel. An alpha-alumina insulating annular spacer 17 between the nut 16 and the end cap 13 prevents the cell from being short-circuited by the clamping arrangement.

Referring again to FIG. 1a for further detail, a circuit breaking means in the form of a composite member 18 of bent rod-like form has one end welded to the wicking tube 6, and the other end extending through a hole 20 in the end cap 13 and welded thereto, thereby providing an electrical connection in the internal electric circuit of the cell between the wicking tube 6 and the end cap 13 which acts as the negative terminal. The composite member 18 comprises stainless steel end sections 18a friction welded to an eluminum alloy inner portion 18b. The inner portion 18b has a waisted region 18c to provide a predetermined relatively high electrical resistance. The composite member 18 is therefore arranged to be responsive to the internal temperature and/or electric current flowing in the cell and is adapted so that the aluminium alloy inner portion 18b fuses upon the occurrence of a predetermined abnormal temperature, of the order of 500° C, and the waisted region 18c fuses upon the occurrence of a predetermined abnormal electric current to restore the cell to open circuit voltage.

During operation of the cell when it is connected to an external circuit (not shown) sodium atoms are ionised by the solid electrolyte 2 giving up electrons which flow from the cell through the wicking tube 6, the member 18, and the end cap 13, through the external circuit, and then into the outer compartment 5 via the casing 3 where they combine with the sulphur and sodium ions to form polysulphides. In the event of some fault conditions leading to an abnormally high temperature in the cell, or high current flow through the composite member 18, the inner portion 18b of the composite member 18 fuses to restore the cell to open circuit voltage. For example, if an internal short circuit occurs in the solid electrolyte 2 due to a dendrite, the additional electronic current would not flow through the composite member 18, but would flow through the dendrite leading to self-discharge of the cell. The composite member 18 would not take an increased current, but would fuse when the cell temperature increased as a result of the short circuit, thereby reducing the total current flow of the cell and helping to arrest the temperature rise, although the cell however would still undergo self-discharge. The composite member 18 is particularly effective in the case of short circuits at the seals 14, external short circuits, or some fault in the thermal control of the cell.

The composite member 18 also provides a safeguard where a number of cells are connected in parallel. If several of these cells fail and develop a high internal resistance, high currents would be passed through the remaining cells but in such an event the composite member 18 would fuse to isolate the cells.

The invention is also applicable to electric cells in which the relative positions of the liquid anode and liquid cathode are reversed as shown in FIG. 2 to which reference is now made. Sodium is now contained in the outer compartment 5, and sulphur impregnated in a graphite felt is contained in the inner compartment 4.

A current collector 24 in the form of a graphite rod extends into the inner compartment 4 and has a flanged end 25 which locates in a recess in an alpha-alumina 'Z' cross section hollow cylindrical support piece 26, the outer flange of which rests on the end of the solid electrolyte 2, the support piece 26 being joined to the solid electrolyte 2 by a glass frit seal 2. An alpha-alumina annular clamping spacer 27 is disposed in the bore of the support piece 26 between the flanged end 25 and the end cap 13, and a "Grafoil" seal 14 is disposed between the flanged end 25 and support piece 26 so that when the threaded sleeve 15 is tightened, the spacer 27 bears against the flanged end 25 to provide a sealed compartment for the composite member 18 and protect it against the ingress and therefore the corrosive effect of sulphur vapour.

Referring now to FIG. 2a, the composite member 18 has a threaded end which engages a threaded hole in the flanged end 25, while its other end is welded to the end cap 13 in a similar manner to that described in relation to FIGS. 1 and 1a. The composite member 18, in section, may be bent for example, to assume an arcuate form, thereby enabling a lengthened member 18 to be used. The end cap 13 now provides the positive terminal and the casing 3 the negative terminal. The composite member 18 may be made with only one end section 18a for welding to the end cap 13, the aluminum inner portion 18b being extended and threaded so as to engage the threaded hole in the flanged end 25, but allowance must be made for the increased thermal expansion of aluminum compared with that of stainless steel.

The composite member 18 performs the same function in the cell described in relation to FIGS. 2 and 2a as it does in the cell described in relation to FIGS. 1 and 1a. To protect the composite member 18 from the corrosive effect of any sulphur vapour which may eventually penetrate the Grafoil seal 14, it may be coated with, for example, a ceramic material such as alpha-alumina or encapsulated in a suitable inert material. Alternatively, the composite member may be made from materials resistant to sulphur vapour such as gold, or a gold/nickel alloy. It will be appreciated that in the arrangement shown in FIG. 1, less corrosive conditions are encountered by the composite member 18 in the sodium compartment.

Although the invention has been described in relation to electric cells of tubular form it is also applicable to cells having alternative configurations, for example of flat form.

The invention has also been described in relation to a circuit breaking means which fuses to restore the cell to open circuit voltage, but alternative circuit breaking means such as one based on the use of a bimetallic circuit breaker may be used as shown in the fragmentary section of FIG. 3 to which reference is made.

The cell shown in FIG. 3 is similar in many respects to that shown in FIG. 2. The composite member, 18 of FIG. 2 however is replaced by a circuit breaker having a moving contact in the form of a bimetallic strip 31 arranged to contact a stainless steel stud 30 screwed into the flanged end 25 of the current collector 24. The bimetallic strip 31 is formed from a strip 31a of "Nilo K" and a strip 31b of stainless steel, and locates on the shoulder of a stainless steel shouldered pin 32, the end of which is rivetted over to retain the strip 31. The cross-section of the bimetallic strip 31 is arranged to provide a predetermined relatively high electrical resistance so that the bimetallic strip 31 is responsive to current.

The other end of the pin 32 is joined to the end cap 13 in a similar manner to the way described in relation to the composite member 18 of FIGS. 1 and 1a. The support piece 26 is now supported by the flange 11, the end cap 13 being recessed to provide the required clearance, and is joined to the solid electrolyte 2 by a glass frit seal 12.

At normal operating temperatures and/or electric current, the strip 31 is in contact with the stud 30 to complete the electric circuit in the cell. In the event of abnormal temperatures and/or electric current, the strip deflects through uneven expansion of the stainless stel strip 31b relative to the "Nilo K" strip 31a as shown in dotted outline in FIG. 3, to restore the cell to open circuit voltage.

The same considerations with regard to protection from the corrosive effect of sulphur vapour apply to the stud 30, strip 31 and pin 32, as they apply to the rod member 18.

The use of a bimetallic strip means arrangement as shown in FIG. 3 is also applicable with appropriate modifications to the cell shown in FIG. 1, the stud 30, for example, being welded to the wicking tube 6 and bent to bring it perpendicular to the strip 31.

It will be appreciated that when a bimetallic strip means arrangement is used, the cell open circuit voltage will be restored in the event of abnormal temperature in the cell but the cell circuit will be re-established when the cell has cooled. In the case of an abnormal current, an intermittent switching action will occur. The bimetallic strip may be made so that it deflects in the event of abnormal temperature in the cell but is not responsive to current likely to be produced by the cell.

The invention may be incorporated in electric cells using suitable alternative materials from those described in relation to the cells shown in FIGS. 1 and 2. For example, a current collector of composite construction formed from a metal, such as aluminium, sheathed with graphite may be used in place of the current collector 24 shown in FIG. 2. Alternative materials may also be used for the composite member 18 and the bimetallic strip 31.

The invention has been described in relation to the use of a circuit breaking means responsive to abnormal current and temperature. Naturally, it also has applications where a circuit breaking means responsive only to temperature or current is required. For example, the member 18 may be made wholly from a material (e.g. aluminum) which fuses on the occurrence of abnormal temperature, but without having a waisted region 18c. When the member 18 is made from a material which cannot be welded to the end cap 13, or the wicking tube 6, it may, for example, have its ends rivetted to the end cap 13 and wicking tube 6.

We claim:

1. An electric cell comprising a solid electrolyte which partially bounds on one side a compartment containing liquid sodium and on the other side a compartment containing liquid sulphur impregnated in a graphite felt, and a circuit breaking means connected inside the cell in series in the internal electric circuit of the cell, said circuit breaking means being responsive both to the temperature within the cell and to the electric current carried by the cell and being arranged to interrupt the internal electric circuit upon either the temperature or the current reaching a predetermined value.

2. An electric cell as claimed in claim 1, wherein the circuit breaking means is disposed in a space communicating with the compartment containing liquid sulphur, and sealing means between said space and said liquid sulphur inhibit the ingress of vapour from the liquid sulphur into said space.

3. An electric cell as claimed in claim 1, wherein the solid electrolyte is of blind-ended tubular form and the liquid sulphur compartment is provided by the space inside the tubular solid electrolyte, a current collecting means extends from one end thereof in spaced relationship along the length of the liquid sulphur compartment from the open end thereof, a metal end cap closes the liquid sulphur compartment at said open end, and the circuit breaking means is connected between the end cap and the one end of the current collecting means, whereby in operation with the longitudinal axis of the solid electrolyte in a substantially vertical orientation and the open end of the solid electrolyte uppermost, the circuit breaking means provides a series connection between the end cap and the current collecting means.

4. An electric cell as claimed in claim 1, wherein the circuit breaking means comprises a fusible link of rod-like form of a metal selected to fuse on reaching said predetermined temperature and having a local waisted region to provide a predetermined relatively high electrical resistance so that said region fuses on reaching said predetermined current.

5. An electric cell as claimed in claim 1, wherein the circuit breaking means comprises a temperature and current responsive switch, said switch having a moving contact provided by a bimetallic strip member arranged to provide a predetermined electrical resistance so as to deflect and interrupt said circuit at either said predetermined cell temperature or current.

6. An electric cell as claimed in claim 3, wherein a hollow ceramic support member is joined to the solid electrolyte at the open end thereof, the current collecting means is in the form of a graphite rod having a flange at the one end arranged to be supported from the support member, a compression sealing member is disposed between the support member and the flange, and a ceramic spacer member is disposed between and abuts the flange and the end cap, the axial length of the spacer member being so arranged that the sealing member is held sealingly compressed.

7. An electric cell as claimed in claim 4, wherein metal end portions joined at each end of the fusible link are adapted for mechanical connection in the cell.

8. An electric cell comprising a metal casing of blind-ended tubular form; a solid electrolyte of blind-ended tubular form disposed substantially co-axially lengthwise within the casing to define therebetween an annular compartment, the open ends of said casing and solid electrolyte being arranged together at the same axial end; liquid sodium contained in the annular compartment; a current collector of graphite and of cylindrical form and having a flanged end, said current collector being disposed so as to extend from the flanged end thereof substantially co-axially within the cylindrical space inside the solid electrolyte to define therebetween an annular space; liquid sulphur impregnated in a graphite felt contained in said annular space; a first ceramic support member of annular form joined by glass sealing means to the solid electrolyte near its open end to provide an outwardly directed support for solid electrolyte, said first support member being arranged to close the annular compartment; a second ceramic support member of hollow form disposed within the solid electrolyte and sealed thereto at the open end thereof by glass sealing means, said second ceramic support member having an inwardly directed flange supporting the flange of the current collector; sealing means between the inwardly directed flange and the flange of the current collector; a metal end cap closing the hollow space of the second ceramic support member; a ceramic spacer member of annular form disposed in abutting relationship between the end cap and the flange of the current collector so as to hold the sealing means sealingly compressed; and an electrically conductive metallic member connected at one end to the flanged end of the current collector and at the other end of said metallic member to the end cap and thereby in series in the internal electric circuit of the cell, said metallic member having a portion adapted to fuse on reaching a predetermined temperature so as to break said internal electric circuit.

9. An electric cell comprising a metal casing of blind-ended tubular form; a solid electrolyte of blind-ended tubular form disposed substantially co-axially lengthwise within the casing to define therebetween an annular compartment, the open ends of said casing and solid electrolyte being arranged together at the same axial end; liquid sodium contained in the annular compartment; a current collector of graphite and of cylindrical form and having a flanged end, said current collector being disposed so as to extend from the flanged end thereof substantially co-axially within the cylindrical space inside the solid electrolyte to define therebetween an annular space; liquid sulphur impregnated in a graphite felt contained in said annular space; a first ceramic support member of annular form joined by glass sealing means to the solid electrolyte near the open end thereof to provide an outwardly directed support for said solid electrolyte, said first support member being arranged to close the annular compartment; a second ceramic support member of hollow form disposed within the solid electrolyte and sealed thereto at the open end thereof by glass sealing means, said second ceramic support member having an inwardly directed flange supporting the flange of the current collector; sealing means between the inwardly directed flange and the flange of the current collector; a metal end cap closing the hollow space of the second ceramic support member; a ceramic spacer member of annular form disposed in abutting relationship between the end cap and the flange of the current collector so as to hold the sealing means sealingly compressed; an electrically conductive bimetallic strip member formed of two metal strips joined together back-to-back; a metal rod-like member joined at one end to the end cap and having one end of the bimetallic strip member rigidly connected to the other end of the rod-like member so that said rod-like member extends transversely from a face of said bimetallic strip member; and a metal contact member connected to the flanged end of the current collector; the proportions and disposition of the rod-like member, the bimetallic strip member and the contact member being so arranged with respect to each other that at the operating temperature of the cell the bimetallic strip member is held in contact with the contact member and thereby in series in the internal electric circuit of the cell but on the bimetallic strip member reaching a predetermined temperature the bimetallic strip member deflects away from the contact member through uneven expansion of the metal strips with respect to each other thereby interrupting said internal electric circuit.

* * * * *